United States Patent
Flowerday

(10) Patent No.: US 6,712,413 B1
(45) Date of Patent: Mar. 30, 2004

(54) ANTI-BUFFETING VEHICLE MIRROR ASSEMBLY

(75) Inventor: Randall B Flowerday, Milford, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/247,914

(22) Filed: Sep. 20, 2002

(51) Int. Cl.$^7$ ................................. B60J 1/20
(52) U.S. Cl. ................. 296/1.11; 296/180.1; 359/509; 359/549; 248/476
(58) Field of Search ............... 296/1.11, 180.1, 296/180.5, 206, 146.1, 152, 1.07; 248/475.1, 476; 359/507, 508, 509, 549; 206/573

(56) References Cited

U.S. PATENT DOCUMENTS

| | | | | |
|---|---|---|---|---|
| 3,522,584 A | * | 8/1970 | Talbot | 362/494 |
| 3,990,774 A | * | 11/1976 | Gotz | 359/507 |
| D249,340 S | * | 9/1978 | Braid | D12/187 |
| 4,196,930 A | * | 4/1980 | Busche | 296/91 |
| 4,200,327 A | * | 4/1980 | Wepler | 296/91 |
| 4,449,796 A | * | 5/1984 | Janssen et al. | 359/507 |
| D276,514 S | * | 11/1984 | Envall et al. | D12/187 |
| 4,538,851 A | * | 9/1985 | Taylor | 296/180.1 |
| 4,759,620 A | * | 7/1988 | Sakuma et al. | 359/841 |
| 5,150,941 A | * | 9/1992 | Silzer et al. | 296/152 |
| 5,903,389 A | * | 5/1999 | Rumez et al. | 359/509 |
| D427,127 S | * | 6/2000 | Horowitz | D12/187 |
| D432,473 S | * | 10/2000 | Sieber | D12/187 |
| 6,213,537 B1 | * | 4/2001 | Butz et al. | 296/152 |
| 6,419,300 B1 | * | 7/2002 | Pavao et al. | 296/180.1 |
| 2003/0026008 A1 | * | 2/2003 | Tanaka | 359/838 |

* cited by examiner

Primary Examiner—D. Glenn Dayoan
Assistant Examiner—Patricia L. Engle
(74) Attorney, Agent, or Firm—Ralph E. Smith

(57) ABSTRACT

A mirror assembly is provided for use on an external surface of a vehicle having a mirrored surface disposed in an external shell and a mirror flag operably connected to the external shell for attachment to an external surface of a vehicle. The mirror flag includes at least one spoiler disposed between the external shell and the mirror flag for directing air flow caused by forward movement of the vehicle. Specifically, the at least one spoiler serves to direct the air flow away from the mirror assembly as well as away from the vehicle surface to improve the aerodynamics of the vehicle and reduce wind noise produced by the air flow contacting the mirror.

8 Claims, 4 Drawing Sheets

ANTI-BUFFETING VEHICLE MIRROR ASSEMBLY

FIELD OF THE INVENTION

The present invention relates to a mirror assembly and, more particularly, to an improved mirror assembly for an automotive vehicle.

BACKGROUND OF THE INVENTION

In vehicle design, meeting aerodynamics and wind noise requirements is increasingly important, as well it is further desirable that a vehicle be capable of meeting occupant comfort requirements. In meeting both requirements, the design and placement of external components on an outer surface of a vehicle play a significant role.

Generally speaking, external components disposed on an outer surface of a vehicle, e.g., a side view mirror assembly, tend to adversely affect aerodynamics and increase passenger compartment noise. Accordingly efforts are made to design external components in conformance with the generally streamlined external surface of a vehicle.

The side view mirror assembly presents an aerodynamic design challenge because the mirror assembly not only has to be mounted on an outer surface of the vehicle, but must extend away from the surface to give the occupant a desired view behind the vehicle. In addition, side view mirrors assemblies are typically disposed at an angle to the vehicle body, as well as provide an adjustment mechanism to accommodate the varying viewing angle of different occupants.

The angular relationship of the mirror assembly to the body in combination with the distance the mirror assembly is typically disposed from the vehicle surface tends to create wind noise. Specifically, forward movement of the vehicle creates air flow over the external surface of the vehicle and over the side view mirror assembly. Generally speaking, this air flow creates wind noise due to the fact that the side view mirror assembly interrupts the flow of air over the vehicle surface and causes a turbulent flow of air behind the mirror assembly. Conventional mirror assemblies mitigate the effect of the air flow around the side view mirror assembly by including an external shell to redirect the air flow behind the mirror generally toward the vehicle body but away from the occupant to reduce the noisy condition.

The external shell of a conventional mirror assembly generally includes a hemispherical shape surrounding the mirror itself and serves to cut through the air flow and reduce wind noise. The hemispherical shape typically extends over the length of the leading edge of the mirror up to the opening of a mirror recess. Because the mirror is disposed at an angular relationship to the occupant the air flow is redirected at an angle generally towards the surface of the vehicle and often reacts against a surface of the vehicle generally rearward of the side view mirror. In this manner, the noise caused by the air flowing over the external shell of the side view mirror bypasses the mirror recess and often reduces the wind noise experienced by the occupant.

Current side view mirror assemblies further include a mirror flag for attachment to a vehicle, whereby the mirror flag joins the side view mirror assembly generally at the base of the mirror and connects to the vehicle body. Conventional mirror flags are often attached to the vehicle at the junction of the door glass frame and the door body and include a sweeping surface disposed between the side view mirror assembly and the vehicle and a triangular shaped portion attached to the vehicle. Mirror flags further cooperate with the generally hemispherical surface of the side view mirror assembly to facilitate movement of the air flow over the side view mirror and away from the mirror recess to a location on the vehicle body generally behind the occupant. In this manner, mirror flags typically assist in redirecting the air flow caused by the moving vehicle generally towards the door and away from the mirror recess.

Conventional side view mirror assemblies and mirror flags, while preventing air flow from entering the mirror recess and reducing wind noise, do not completely satisfy the problem of wind noise caused by the flow of air over the side view mirror assembly. Specifically, conventional side view mirror assemblies and mirror flags generally suffer from the fact that the air flow is forced to flow towards the vehicle where it often contacts other external components such as door handles and weather stripping. Air flow contact with these external components creates additional wind noise. This condition is usually worsened, for example, when the front door glass is down and the door B-pillar is exposed. In this situation, the B-pillar acts as a pocket to catch the air flow from the side view mirror, thus creating pulsation of the passenger compartment air cavity. The noise caused by the pulsation is referred to as buffeting.

SUMMARY OF THE INVENTION

Accordingly, the present invention provides a mirror assembly for use on an external surface of a vehicle having a mirrored surface disposed in an external shell and a mirror flag operably connected to the external shell for attachment to an external surface of a vehicle. The mirror flag includes at least one spoiler disposed between the external shell and the mirror flag for directing air flow caused by forward movement of the vehicle. In accordance with one aspect of the present invention, a plurality of spoilers can be employed. Specifically, the at least one spoiler serves to direct the air flow both away from the mirror assembly as well as the vehicle surface, resulting in improved window-down buffeting and reduced turbulence.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

With reference to the figures, a mirror assembly 10 is provided and includes a mirror 12, an external shell 14, and a mirror flag 16. The mirror 12 is generally disposed within the external shell 14 while the mirror flag 16 serves to support the external shell 14 and the mirror 12. In one embodiment, the mirror 12 is positionable relative to the external shell 14, while in another embodiment, the external shell 14 is positionable relative to the mirror flag 16, as will be discussed further herein below.

Figure 4:
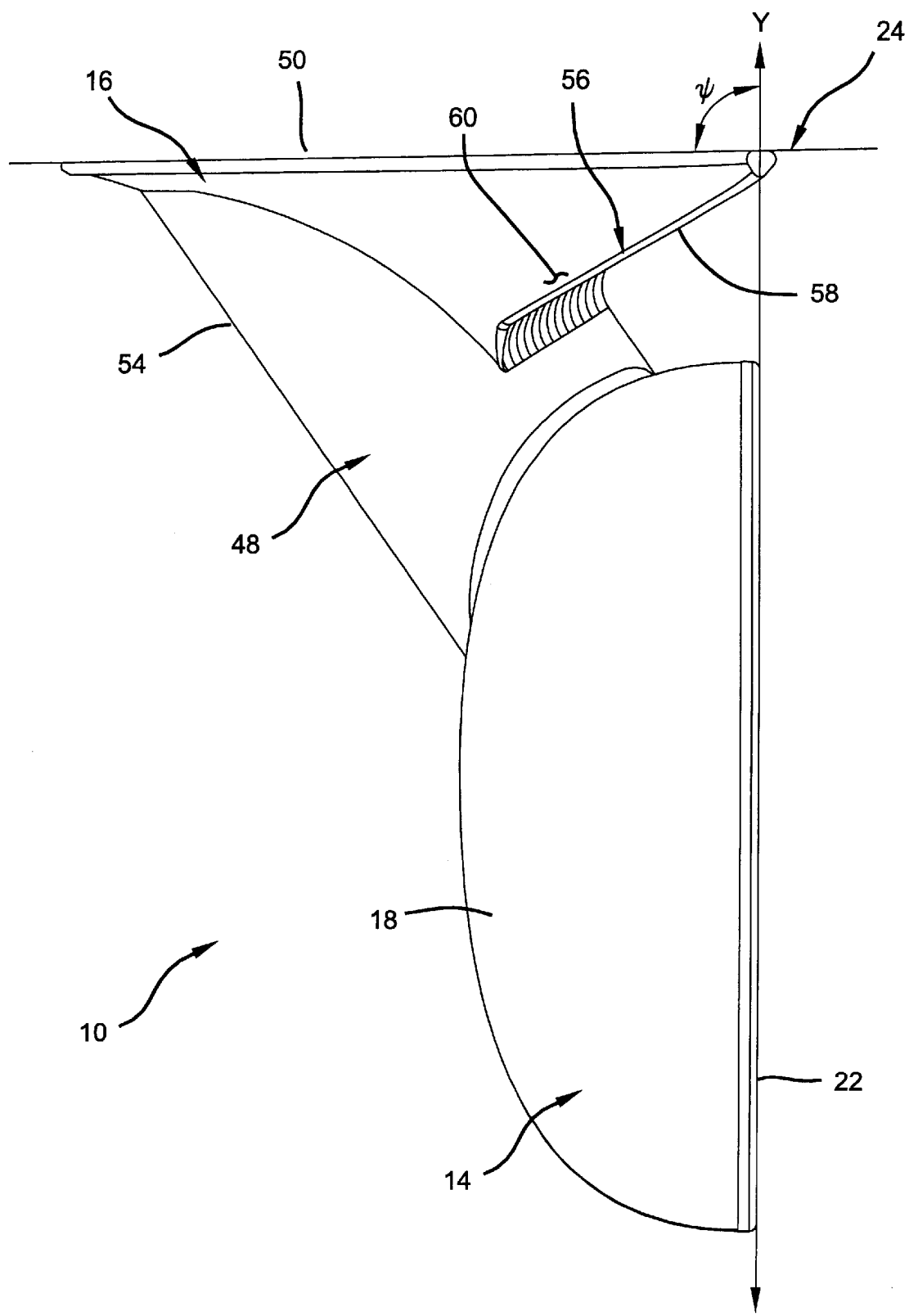
FIG. 4 is a top elevational view of the mirror assembly of FIG. 1.

The external shell 14 serves as a housing for the mirror 12 and includes a generally hemispherical outer surface 18, a recess 20, and a bottom surface 21. The hemispherical surface 18 extends generally over the entire outer surface of the shell 14 and terminates at the edge of the recess 20 as best shown in FIG. 4. A plane 22 is created at the junction of the recess 20 and the hemispherical outer surface 18 along axis Y as shown in FIG. 4. The plane 22 establishes the angular relationship of the recess 20 to an external surface, whereby the angular relationship is shown as $\psi$ by way of reference in FIG. 4. In one embodiment, the external surface is a body panel of a motor vehicle 24, whereby the external shell 14 serves to fixedly hold the mirror 12 in a fixed relationship to the body 24. In this manner, the plane 22 defines the angular relationship of the external shell 14 to the external surface of the vehicle 24. Alternatively, the external surface is a door assembly 52, whereby the external shell 14 serves to fixedly hold the mirror 12 in a fixed relationship to the door assembly 52. In this manner, the plane 22 defines the angular relationship of the external shell 14 to an outer surface of the door assembly 52.

Figure 2:
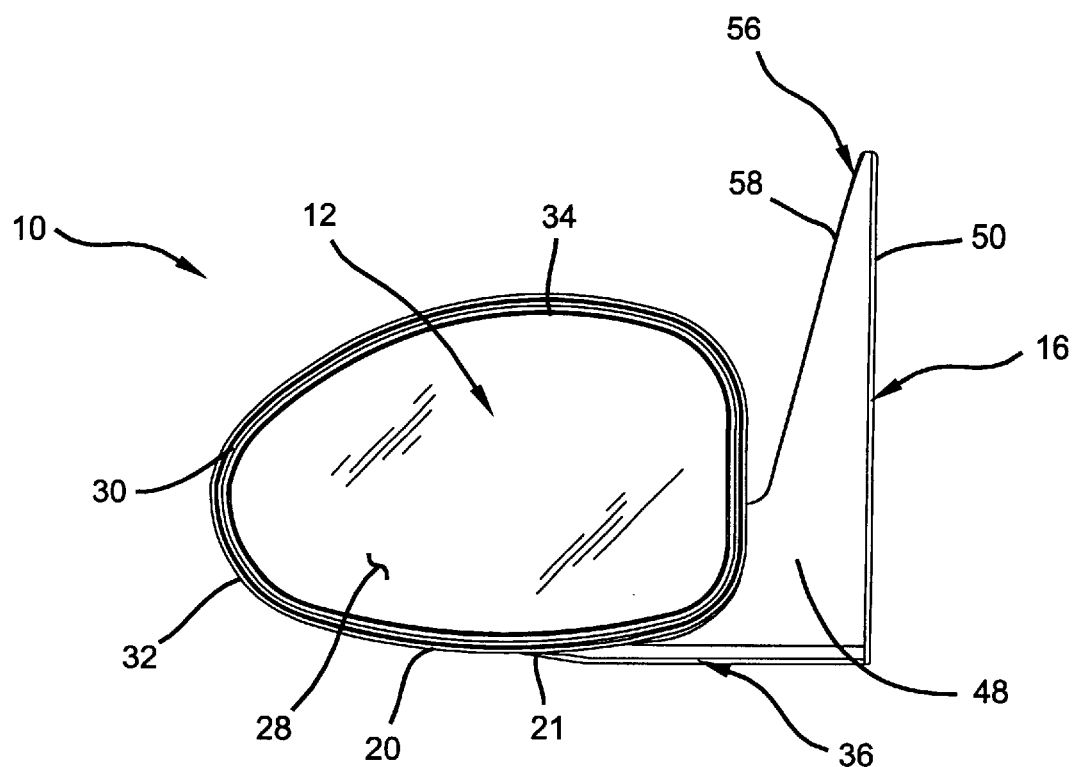
FIG. 2 is a rear elevational view of the mirror assembly of FIG. 1.

The mirror 12 is disposed in the recess 20 of the external shell 14 and includes a reflective surface 28. The reflective surface 28 can be shaped such that it completely fills the recess 20 of the shell 14 as best shown in FIG. 2 and is disposed generally along the plane 22. As such, the relationship of the mirror 12 to the external surface of the vehicle 24 is generally governed by the relationship of the plane 22 to the external surface. In one embodiment the mirror 12 is permitted to rotate relative to the external shell 14 and, therefore, may be positioned at a different angular relationship relative to an external surface than the angular relationship of the plane 22 to the same external surface. In this manner, a slight clearance 30 is provided between an interior surface 32 of the shell 14 and an edge 34 of the mirror 12 to accommodate movement of the mirror 12 within the recess 20, as best shown in FIG. 2.

Figure 3:
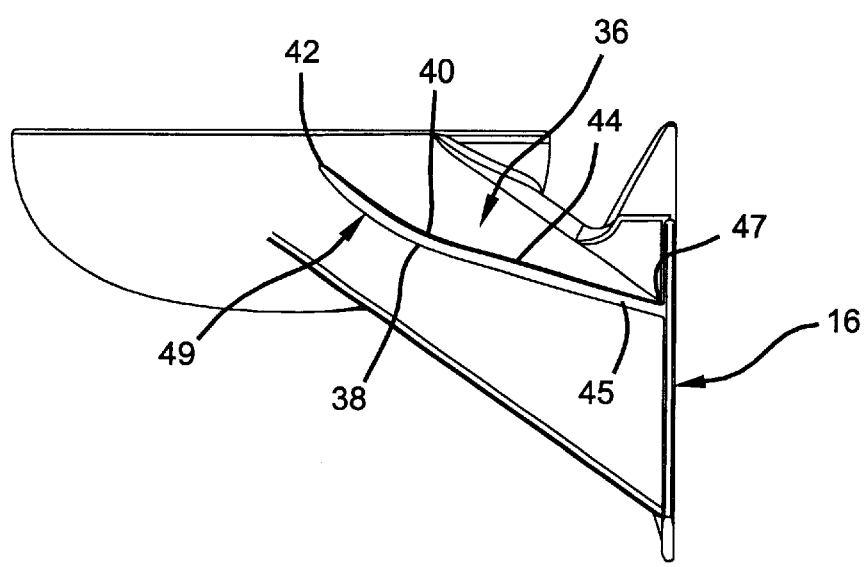
FIG. 3 is a perspective view of a spoiler in accordance with the principals of the present invention.
Figure 5:
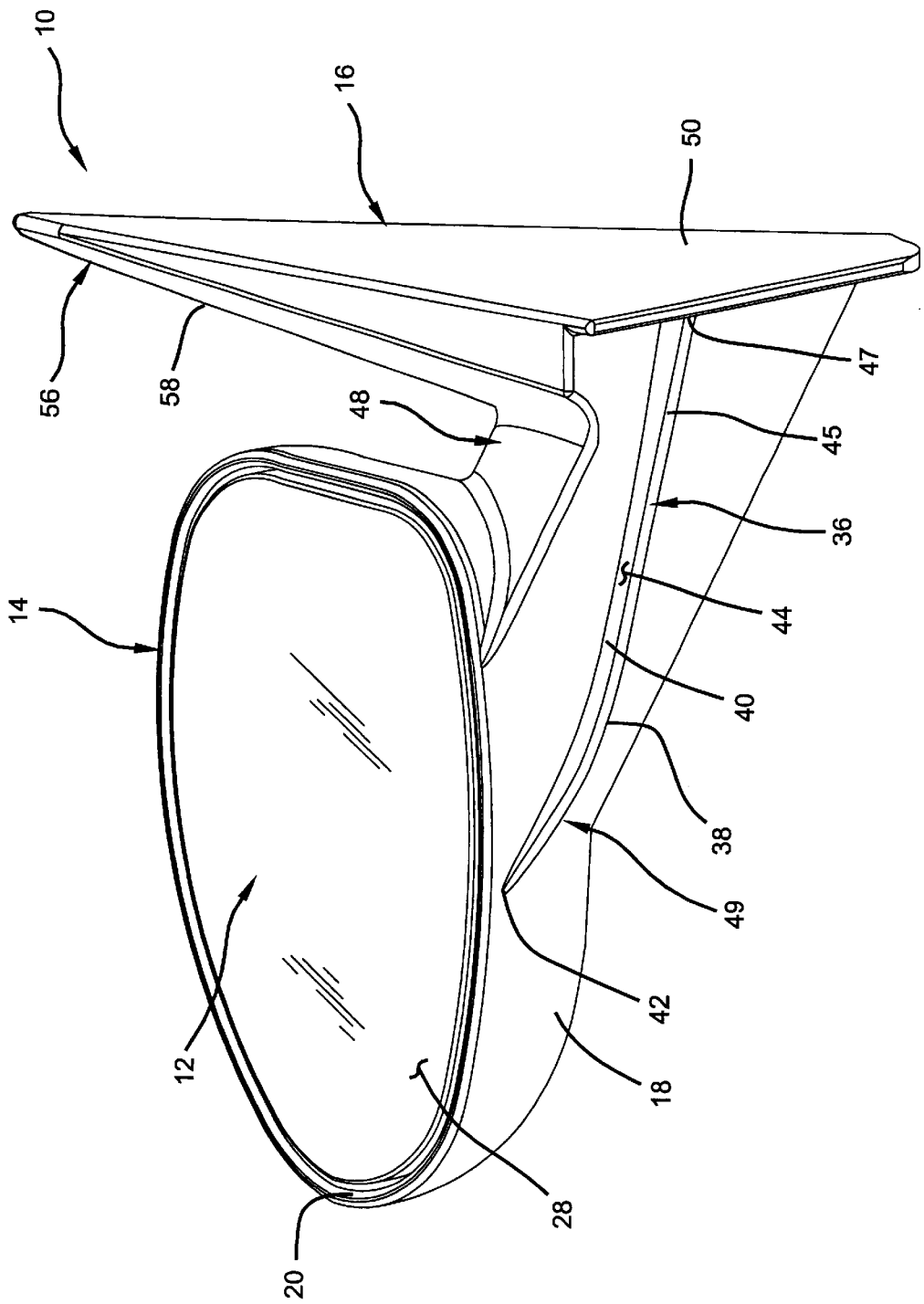
FIG. 5 is a perspective view of a mirror assembly in accordance with the principals of the present invention depicting a spoiler disposed on a bottom surface of the mirror assembly.

The external shell 14 further includes a first spoiler 36 disposed adjacent the bottom surface 21 of the shell 14, as best shown in FIG. 5. The first spoiler 36 is an arcuate fin generally extending along the bottom surface 21 of the shell 14 and serves to redirect the air flow around the mirror assembly 10 and away from the vehicle. With particular reference to FIG. 3, the first spoiler 36 includes a generally straight section 45 extending from the mirror flag 16 and includes a junction 47 formed in cooperation with a surface of the mirror flag 16. In this manner, the junction 47 causes the air flow to be forced against the mirror flag 16 and subsequently along the first spoiler 36.

With continued reference to FIG. 3, the straight section 45 extends from a surface of the mirror flag 16 and terminates at a curved portion 49 of the first spoiler 36. The curved portion 49 includes a convex surface 38 extending away from plane 22 and a concave surface 40 extending generally towards plane 22. In this manner, the first spoiler 36 extends outwardly towards plane 22 and terminates at a tip 42. In addition, the first spoiler 36 includes a reaction surface 44 disposed along the length of the first spoiler 36, generally extending from the straight portion 45 along the concave surface 40 and terminating at the tip 42.

As previously mentioned, the air flow contacting the junction 47 reacts against the mirror flag 16 and is caused to flow generally along the first spoiler 36. Specifically, as the air flow moves from the junction 47, it first contacts the straight portion 45 and generally contacts the reaction surface 44 and the bottom surface 21 of the external shell 14. Once the air flow reaches the curved portion 49 of the first air foil 36 it continues to react against the bottom surface 21 and the reaction surface 44 but now contacts the concave surface 40 as well and begins to move towards the tip 42. Once the air flow has traveled sufficiently along the concave surface 40 and reaches the tip 42 it effectively flows over the tip 42 and away from the vehicle 24. As such, the curvature of the concave surface 40 and location of the tip 42 generally define when and in what direction the air flow will depart the first spoiler 36.

In one embodiment, the mirror assembly 10 may be mounted to an external surface of a vehicle body 24 as previously discussed. As such, the mirror assembly 10 is subjected to an air flow caused by forward movement of the vehicle (not shown). The external shell 14, and subsequently plane 22, are positioned at an angle relative to the external surface of the vehicle 24 to provide the occupants with a view of an area behind the vehicle 24. In this manner, the air flow will first contact the hemispherical outer surface 18 of the shell 14 and be caused to flow over the mirror assembly 10.

To mitigate the tendency of the air flow to be trapped by the recess 20, and thus create wind noise, the first spoiler 36 traps the air flow between the bottom surface 21 and the reaction surface 44. Because the first spoiler 36 is disposed such that the concave portion 40 faces plane 22 and opens at tip the 42, the air flow is trapped between the bottom surface 21 of the shell 14 and the reaction surface 44 of the first spoiler 36. Thus, the air flow is forced along a path following the concave surface 40 towards the tip 42 until it finally is moved away from the mirror assembly 10. The first spoiler 36 redirects the air flow caused by the forward movement of the vehicle down and away from not only the mirror assembly 10 but also from the vehicle 24, thereby reducing the wind noise associated with the air flow contacting mirror assembly 10 and the vehicle 24.

The mirror flag 16 serves to support the external shell 14 and, thus, the mirror 12, and includes a mounting bracket having a generally triangular shape and an arm 48 interconnecting the mirror flag 16 and the shell 14. In one embodiment the arm 48 and the external shell 14 are integrally formed such that the shell 14 is not permitted to move relative to the arm, while in another embodiment the arm 48 rotatably supports the shell 14 such that the shell 14 is permitted to rotate relative to the mirror flag 16.

The mounting bracket of the mirror flag 16 includes a flat portion 50 for engagement with an external surface. In one embodiment, the mounting bracket fixedly mounts to the vehicle 24, while in another embodiment the mounting bracket fixedly mounts to a door assembly 52 of the vehicle 24. It should be noted that while a mounting bracket having a generally triangular shape and including a flat portion 50 is disclosed, any shape accommodating an outer surface of a vehicle is anticipated and should be considered within the scope of the present invention.

The arm 48 outwardly extends from the attachment bracket and includes a rounded leading edge 54 and a second spoiler 56 integrally formed thereon. The leading edge 54 serves to cut through an air flow and redirect the air flow towards both the bottom of the shell 14 and the top of the arm 48 such that the air flow contacts the first and second spoilers 36, 56.

Figure 1:
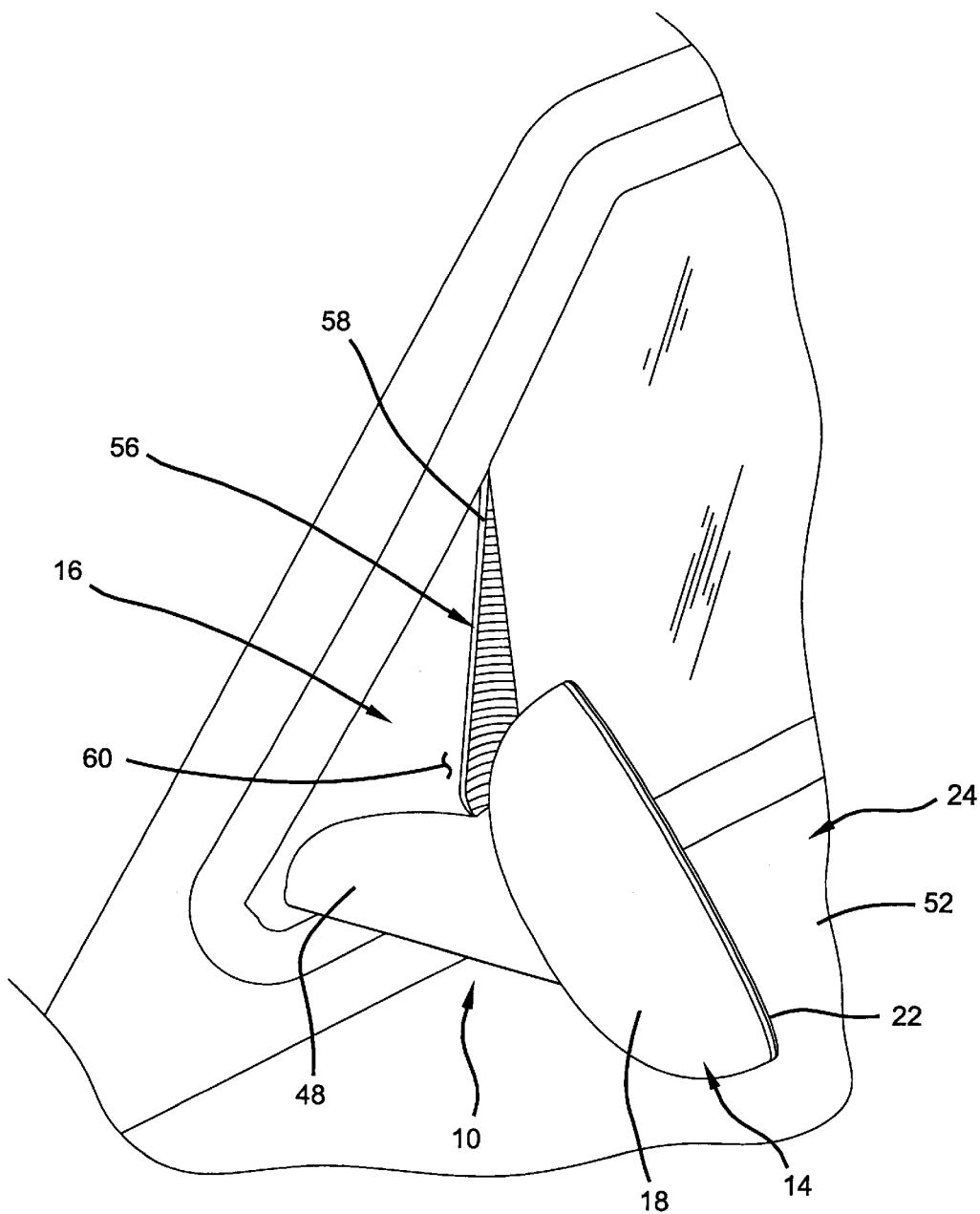
FIG. 1 is a partial perspective view of an automotive vehicle including a mirror assembly in accordance with the principals of the present invention.

The second spoiler 56 extends generally between the mounting bracket and the arm 48 and serves to redirect an air flow away from the shell 14 and the recess 20, thereby reducing wind noise. In one embodiment the mirror assembly 10 is fixedly mounted to the external surface of the vehicle 24 and as such the second spoiler 56 serves to redirect the air flow away from the vehicle 24. The second spoiler 56 has a generally flat leading edge 58 disposed at an angular relationship to the mounting bracket and includes a reaction surface 60 disposed along its length as best shown in FIGS. 1 and 4. It should be noted that FIGS. 1 and 4 include a shaded surface to better show the leading edge 58 and reaction surface 60 and as such should not be construed as additional structure.

In operation, the second spoiler 56 receives an air flow, whereby the air contacts the reaction surface 60 of the leading edge 58 and is caused to move generally away from the recess 20 and over the leading edge 58. Specifically, the reaction surface 60 causes the air flow to move at an angle to the vehicle body 24 up until the air flow reaches the leading edge 58. At this point, the air flow departs the second spoiler 56 and is caused to move away from both the mirror assembly 10 and the vehicle 24 and thus reduces wind noise experienced by the occupant.

While first and second spoilers 36,56 have been disclosed as integrally formed with the shell 14 and the mirror flag 16, it should be understood that the spoilers 36,56 could be formed separately and fixedly attached to the mirror assembly 10 such as in an aftermarket condition or as a separate vehicle accessory.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mirror assembly for directing an air flow away from an external surface of a motor vehicle, said mirror assembly comprising:
    a mirrored surface;
    an external shell supporting said mirrored surface;
    a mirror flag operably connecting said external shell to the external surface of the vehicle; and
    a first spoiler extending from said mirror flag, wherein said mirror flag includes an arm portion and a mounting bracket, said first spoiler extending from said mounting bracket along said arm and said external shell.

2. The mirror assembly of claim 1, wherein said first spoiler includes a planar surface and an arcuate surface, said planer surface extending from said mirror flag to said arcuate surface, said arcuate surface directing the air flow away from the vehicle.

3. The mirror assembly of claim 2, wherein said external shell has a generally hemispherical outer surface to direct an airflow towards said arcuate surface of said first spoiler.

4. The mirror assembly of claim 1, wherein a second spoiler extends from said mounting bracket along said arm and terminates at an intersection of said arm and said external shell.

5. A door assembly for a motor vehicle, said door assembly comprising:
    an outer panel;
    a window opening formed in said door; and
    a side view mirror assembly including:
        a mirrored surface;
        an external shell supporting said mirrored surface;
        a mirror flag operably connecting said external shell to said outer panel; and
        a first spoiler extending from said mirror flag and directing an air flow away from said outer panel, wherein said mirror flag includes an arm portion and a mounting bracket, said first spoiler extending from said mounting bracket along said arm and said external shell.

6. The door assembly of claim 5, wherein said first spoiler includes a planar surface and an arcuate surface, said planer surface extending from said mirror flag to said arcuate surface, said arcuate surface directing the air flow away from said outer panel and said window opening.

7. The door assembly of claim 6, wherein said external shell has a generally hemispherical outer surface to direct an airflow towards said arcuate surface of said first spoiler.

8. The door assembly of claim 5, wherein a second spoiler extends from said mounting bracket along said arm and terminates at an intersection of said arm and said external shell.

* * * * *